US012603876B2

(12) United States Patent
Daniels et al.

(10) Patent No.: US 12,603,876 B2
(45) Date of Patent: Apr. 14, 2026

(54) VALIDATING AN IPV6 ADDRESS FROM AN IPV4 NETWORK

(71) Applicant: DigiCert, Inc., Lehi, UT (US)

(72) Inventors: Jared Daniels, Lehi, UT (US); Benjamin Cardon, Pleasant Grove, UT (US); Ryan Milne, Ogden, UT (US)

(73) Assignee: DigiCert, Inc., Lehi, UT (US)

(*) Notice: Subject to any disclaimer, the term of this patent is extended or adjusted under 35 U.S.C. 154(b) by 138 days.

(21) Appl. No.: 18/731,627

(22) Filed: Jun. 3, 2024

(65) Prior Publication Data

US 2026/0046281 A1 Feb. 12, 2026

(51) Int. Cl.
*H04L 9/40* (2022.01)
*H04L 61/251* (2022.01)

(52) U.S. Cl.
CPC ........ *H04L 63/0823* (2013.01); *H04L 61/251* (2013.01); *H04L 63/105* (2013.01)

(58) Field of Classification Search
CPC . H04L 61/251; H04L 12/4633; H04L 69/167; H04L 12/66; H04L 45/74; H04L 61/5007; H04L 63/105; H04L 63/0823
USPC .......................................................... 726/10
See application file for complete search history.

(56) References Cited

U.S. PATENT DOCUMENTS

| | | | | |
|---|---|---|---|---|
| 7,305,481 | B2 * | 12/2007 | Blanchet | H04L 69/167 709/227 |
| 7,369,560 | B2 * | 5/2008 | Le Pennec | H04L 45/50 370/392 |
| 7,443,880 | B2 * | 10/2008 | Wetterwald | H04L 69/16 370/466 |
| 11,245,663 | B1 * | 2/2022 | Bandeali | H04L 45/741 |
| 2006/0153230 | A1 * | 7/2006 | Miyata | H04L 69/167 370/466 |
| 2006/0253701 | A1 * | 11/2006 | Kim | H04L 61/2564 713/153 |
| 2011/0283018 | A1 * | 11/2011 | Levine | H04L 61/4511 709/245 |
| 2023/0124034 | A1 * | 4/2023 | Carter | H04L 61/2557 370/466 |

FOREIGN PATENT DOCUMENTS

| | | | | |
|---|---|---|---|---|
| CN | 111404878 A * | 7/2020 | | H04L 69/167 |

* cited by examiner

*Primary Examiner* — Lizbeth Torres-Diaz
(74) *Attorney, Agent, or Firm* — Baratta Law PLLC; Lawrence A. Baratta, Jr.

(57) ABSTRACT

Systems and methods are described herein for validating an Internet Protocol (IP) version 6 (IPv6) address from an IP version 4 (IPv4) network. A method, according to one implementation, includes a step of receiving an IPv4-based request from a validation server that is configured to support an IPv4 address space. The method further includes a step of sending an IPv6-based request to a domain supporting an IPv6 address space. Also, the method includes receiving a response status code and domain validation information from the domain. Then, the method includes a step of passing the response status code and domain validation information to the validation server.

20 Claims, 5 Drawing Sheets

| | Use Cases | | |
|---|---|---|---|
| | **Informational Sites & Blogs**<br>- Websites that don't collect payment or sensitive information<br>- Need HTTPS to keep user activity (even blogs) private | **Login Panels & Forms**<br>- TLS/SSL encrypts and protects usernames and passwords and forms used to submit personal information, documents, and images | **Checkout Pages**<br>- Customers are more likely to complete a purchase if they know the checkout areas (and credit card info they share) is secure |
| **Recommended Type of TLS/SSL Certificate** | **Organization Validation (OV) TLS/SSL Certificates**<br>- The second highest level of authenticity and next most rigorous organization checks | **Organization Validation (OV) TLS/SSL Certificates**<br>- The second highest level of authenticity and most rigorous organization checks | **Extended Validation (EV) TLS/SSL Certificates**<br>- The highest level of authenticity and most rigorous identity checks |
| **DigiCert Products** | DigiCert Secure Site<br>DigiCert Basic | DigiCert Secure Site | DigiCert Secure Site Pro |

FIG. 2

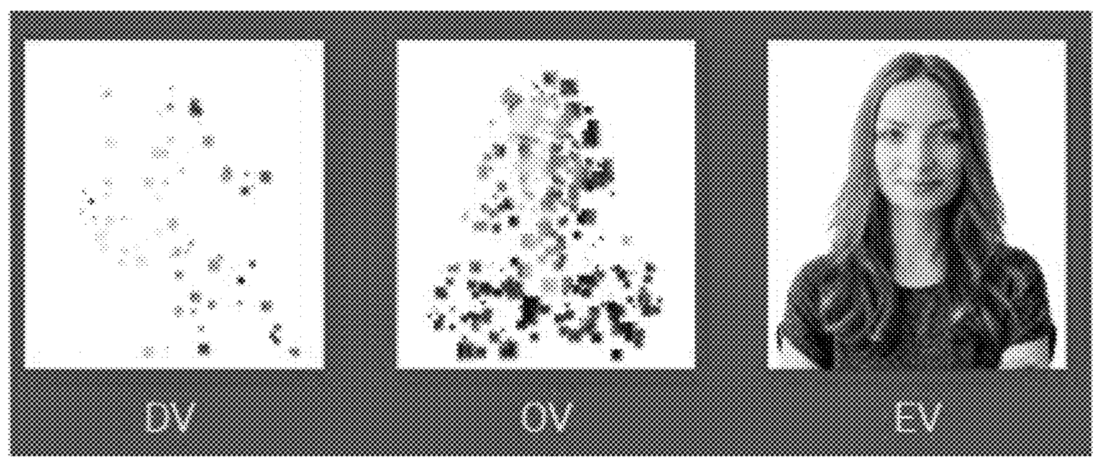
FIG. 3
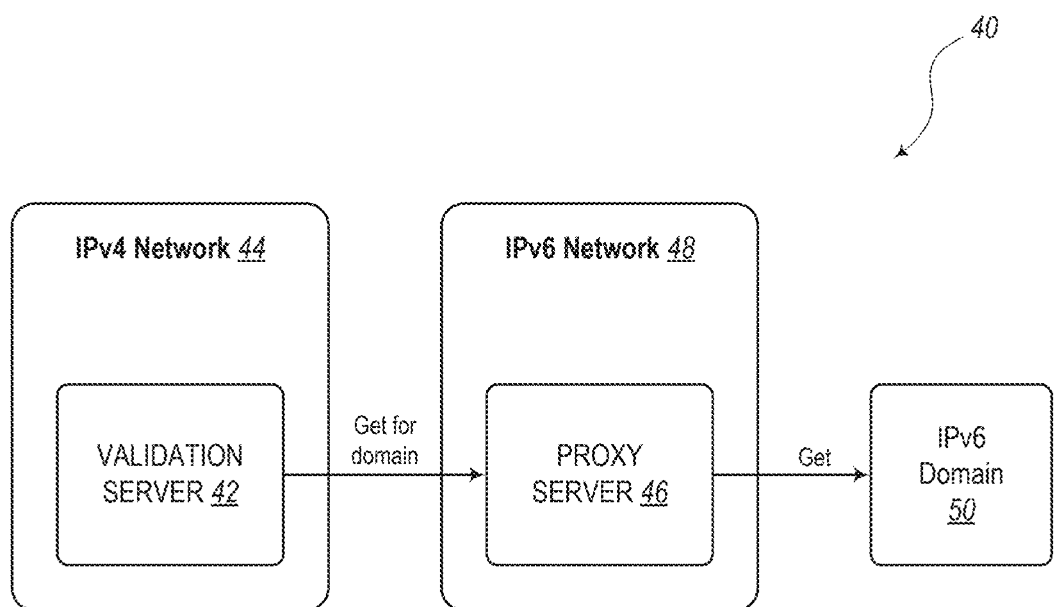
FIG. 4

VALIDATING AN IPV6 ADDRESS FROM AN IPV4 NETWORK

FIELD OF THE DISCLOSURE

The present disclosure relates generally to computer networking and digital certificates. More particularly, the present disclosure relates to systems and methods for validating an Internet Protocol version 6 (IPv6) address from an IP version 4 (IPv4) network, such as during validation associated with digital certificates, such as X.509 certificates.

BACKGROUND

Internet Protocol version 4 (IPv4) is a 32-bit addressing scheme offering billions of unique IP addresses for devices worldwide. IPv4 has been the legacy addressing scheme for Uniform Resource Locators (URLs) for years. The IPv4 addresses are configured to range from 0.0.0.0 to 255.255.255.255 and are represented in decimal or “base 10” form. Although IPv4 has been the dominant protocol for decades, its limitations are becoming increasingly apparent as the number of Internet-connected devices skyrockets. IP version 6 (IPv6), which is a 128-bit addressing scheme capable of employing about $3.4\times10^{38}$ unique URL addresses, was developed to address the limitations of IPv4 and provide a solution for the anticipated future growth of the Internet. The IPv6 addresses are configured to range from 0.0.0.0.0.0.0.0 to ffff.ffff.ffff.ffff.ffff.ffff.ffff.ffff and are represented in hexadecimal or “base 16” form. Service providers, for the most part, have already begun processes for transitioning from IPv4 to IPv6.

BRIEF SUMMARY

The present disclosure relates to systems and methods for automatically validating IPv6 addresses from an IPv4 network domain. According to one implementation, a proxy server may include a network interface, a processing device, and memory. The memory is configured to store computer logic having instructions that, when executed, cause the processing device to perform a step of receiving an IPv4-based request via the network interface, wherein the network interface is configured to receive the IPv4-based request from a validation server that is configured to support an IPv4 address space. Also, the instructions are configured to cause the processing device to send an IPv6-based request via the network interface to a domain supporting an IPv6 address space. Next, the instructions cause the processing device to receive, via the network interface, a response status code and domain validation information from the domain. Then, the processing device is configured to pass the response status code and domain validation information, via the network interface, to the validation server.

Furthermore, in some embodiments, the IPv4-based request may be configured to represent a first Hypertext Transfer Protocol (HTTP) GET request. Before the step of sending the IPv6-based request to the domain, the instructions may further cause the processing device to perform a step of converting the IPv4-based request into the IPv6-based request. For example, the IPv6-based request may represent a second HTTP GET request for requesting the domain validation information from the IPv6 address space. The validation server may be configured to execute a domain validation procedure configured to confirm that an administrator associated with the domain is authorized to manage the domain.

In some implementations, the validation server may be associated with a cloud-based Certificate Authority (CA). The step of passing the domain validation information to the validation server may include a step of enabling the validation server to automatically validate IPv6 addresses. The CA may be configured to operate within the IPv4 address space. The CA may also be configured to issue digital certificates after automatically validating the IPv6 addresses. The proxy server, according to some embodiments, may be arranged externally with respect to the validation server. According to HTTP standards, a response status code of 200, for example, indicates a successful request.

BRIEF DESCRIPTION OF THE DRAWINGS

The present disclosure is illustrated and described herein with reference to the various drawings, in which like reference numbers are used to denote like system components/method steps, as appropriate, and in which:

FIG. 2 is a table illustrating recommended categories of validation products for handling various network security practices, according to various embodiments.

FIG. 3 is a diagram providing a visual representation of different levels of trust for certificates based on different levels of validation, according to various embodiments.

FIG. 4 is a block diagram illustrating a proxy system for validating IPv6 addresses from an IPv4 domain, according to various embodiments of the present disclosure.

DETAILED DESCRIPTION

Again, the present disclosure relates to systems and methods for automatically validating IPv6 addresses from an IPv4 network domain. Currently, validation systems do not support IPv6 addressing. However, with the transition to IPv6 addressing, there is a need to validate these IPv6 addresses as part of a preliminary process prior to issuing digital certificates (e.g., X.509 certificates). The systems and methods of the present disclosure may include a validation server that is configured to operate in a domain in which IPv4 addresses are prevalent. The systems and methods are configured to host a proxy application in a proxy server located externally to the validation server and existing IPv4 network. The proxy server is configured to connect with IPv6 addresses, whereby the proxy application is configured to make calls (requests) to the IPv6 addresses and then return the results.

A request sent to the proxy server may contain the IPv6 address that needs to be validated. The proxy server then makes a request to that IPv6 address in the domain associated with the IPv6 addresses. The response from the IPv6 domain may be captured and returned to a validation server as part of a response body, where the validation service can review the response and automatically perform the needed validation checks. This technique allows the validation server, which may normally operate in the IPv4 realm, to perform certain validation checks (e.g., domain validation) on an IPv6 address even though the network infrastructure may only support the IPv4 address space.

Nevertheless, the systems and methods of the present disclosure can employ an external IPv6 proxy application that can perform a GET request on behalf of the validation server located within the IPv4 network. The IPv6 proxy application is configured to return a HTTP response status code of "200" with a response body needed for validation (e.g., the requested validation information). The HTTP response status code represents the status in the IPv6 domain.

Figure 1:
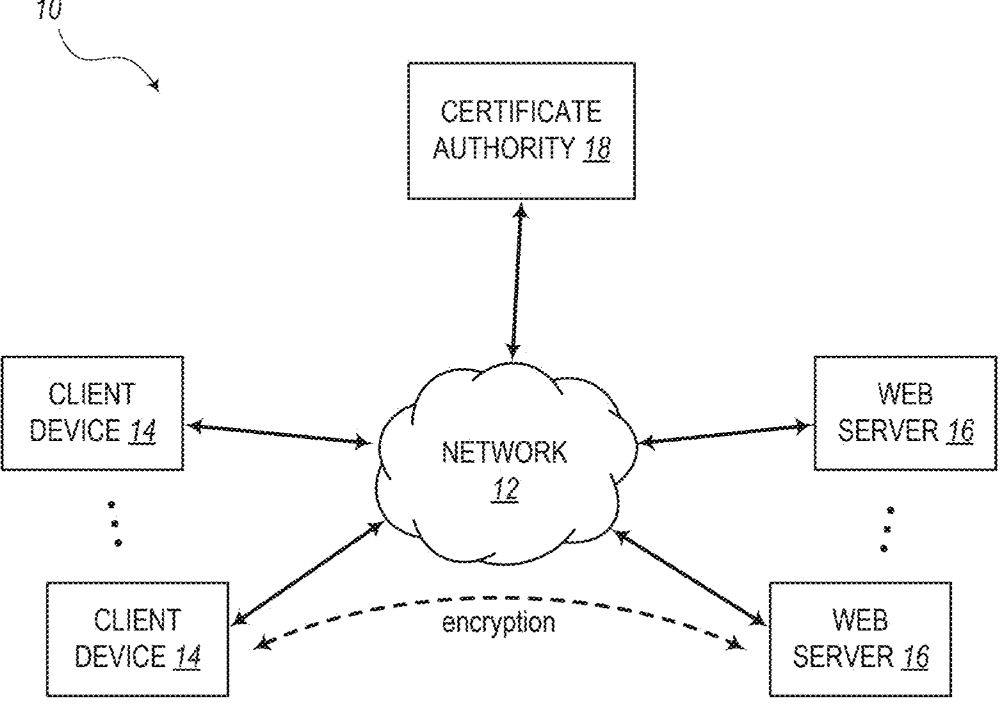
FIG. 1 is a diagram illustrating a communication system, according to various embodiments.

FIG. 1 is a diagram illustrating an embodiment of a communication system 10 that enables communication over a network 12 (e.g., the Internet, Wide Area Network (WAN), etc.). A plurality of client devices 14 are configured to interact with a plurality of web servers 16 via the network 12. Some of the client devices 14 may be grouped within a network domain for representing a specific organization, where one (or more) of these grouped client devices 14 may represent an administrator responsible for managing the network domain for the organization. Also, as shown in FIG. 1, the communication system 10 further includes a Certificate Authority (CA) 18 or other type of digital trust agent configured to ensure safe and trustworthy transmission of data throughout the communication system 10. For example, the CA 18 (e.g., DigiCert, Inc.) may be configured to issue domain certificates to entities (e.g., organizations) and establish trust from the back end of e-commerce websites to ensure digital trust for the real world.

The CA 18 may be configured to issue digital certificates, also referred to as X.509 certificates, Transport Layer Security (TLS) certificates, Secure Sockets Layer (SSL) certificates, TLS/SSL certificates, etc. These digital certificates are a foundational part of a safe and secure Internet. TLS/SSL certificates secure Internet connections by encrypting data sent between a client device 14 (e.g., browser) and a web server 16 that hosts a website a user may be visiting. The digital certificates ensure that data is transmitted privately and without modification, loss, or theft.

The CA 18 is an entity that stores, signs, and issues digital certificates. This allows others (relying parties) to rely upon signatures or on assertions made about the private key that corresponds to the certified public key. The CA 18 acts as a trusted third party—trusted both by the subject (owner) of the certificate and by the party relying upon the certificate. X.509 certificates are defined by ITU X.509, Information technology—Open Systems Interconnection—The Directory: Public-key and attribute certificate frameworks, October 2019, the contents of which are incorporated by reference in their entirety. An X.509 certificate binds an identity to a public key using a digital signature. A certificate contains an identity (a hostname, or an organization, or an individual) and a public key (e.g., RSA, DSA, ECDSA, ed25519, etc.), and is signed by the CA 18.

TLS/SSL certificates (or digital certificates) are often considered to be the standard by which major web browsers ensure a safer Internet experience for users. Websites secured by TLS/SSL certificates are more trusted by Internet users because they encrypt and protect private information transferred to and from their web servers 16. Digital certificates also represent, or certify, a website's brand identity. In that sense, TLS/SSL certificates are both an identity protection measure for online brands and a security measure for companies transmitting private data online. Also, TLS/SSL certificates are configured to improve Search Engine Optimization (SEO) in browsers. In some cases, many browsers may require TLS/SSL certificates and may be configured to boost results of websites that are secured by digital certificates. This includes various types of search engines and browsers.

Digital certificates (X.509s) can be configured to provide data encryption between a client device 14 and a web server 16. TLS/SSL certificates can establish an encrypted connection between a web server 16 and a browser (e.g., client device 14) in a handshaking process (e.g., "SSL handshake" process). For visitors to a website, the process is essentially invisible and can be performed substantially instantaneously. The handshaking process may include:

1) Authentication—For every new session, a user begins on a website, their browser (e.g., client device 14) and the web server 16 exchange and validate each other's TLS/SSL certificates.
2) Encryption—The web server 16 shares its public key with the browser, which the browser then uses to create and encrypt a pre-master key. This is called the key exchange.
3) Decryption—The web server 16 decrypts the pre-master key with its private key, establishing a secure, encrypted connection used for the duration of the session.

Digital trust offered by the CA 18 is a combination of encryption, security, and identity solutions designed to extend protection across virtual interactions to build bridges of trust between the digital and physical worlds. Essentially, digital trust is the unification of TLS/SSL, Internet-of-Things (IoT), Public Key Infrastructure (PKI) security, etc., through a centrally managed platform. Also, many cloud-based email providers use TLS/SSL encryption and can install a TLS/SSL certificate to protect private email servers.

FIG. 2 shows a table 20 that includes recommended categories of validation products for handling various network security practices. An initial validation service (not shown in FIG. 2) may be referred to as a Domain Validation (DV) service. After DV, Organization Validation (OV) and Extended Validation (EV) services may be provided for added security. For example, for informational sites and blogs, OV TLS/SSL certificates are recommended, such as DigiCert's Secure Site or Basic products. For login panels and forms, OV TLS/SSL certificates again may be recommended. However, for higher security websites, such as checkout pages that include online purchasing capabilities, the EV TLS/SSL certificates may be recommended.

Specifically, Domain Validated (DV) certificates are configured to provide the lowest level of identity authentication, meaning that anonymous entities can get a certificate. For example, Jane Does, both benign and malicious, can remain anonymous at this level. Organization Validated (OV) certificates provide additional checks to ensure identity and brand protection, meaning that Jane Does can no longer hide in the shadows at this level. Furthermore, Extended Validation (EV) certificates guarantee the highest standard of identity and brand protection. With EV, organizations can demonstrate a commitment to customers that transactions are secure. Jane Does are thoroughly identified.

When personal information (e.g., name, residence address, credit card information, Social Security Number, etc.) in on the line, the highest level (i.e., EV) of digital security is typically recommended. Presently, EV and OV certificates are used by 81% of businesses in the Global 2000, 89% of Fortune 500 companies, and 97% of the largest banks worldwide. The list of high-assurance EV & OV TLS/SSL certificate users includes IT companies, utilities companies, retail companies, real estate agencies, insurance companies, automotive companies, telecom companies, and hospital/healthcare companies.

A DV process may be an important initial step that may lead to further security implementations for an organization. The aim of a DV process is to ensure that an organization requesting a certificate does, in fact, have the authority to request a certificate for their domain in question. DV may include emails or phone calls to a contact person (e.g., administrator, admin, web master, host, etc.). This contact person may be listed in a domain's WHOIS record as well as emails to default administrative addresses at the domain. For example, the CA 18 may send an authorization email to administrator@domain.com or webmaster@domain.com. After the DV process (or pre-validation), a requestor (e.g., admin) may begin submitting domains for pre-validation and the type of authorization for which the domain should be validated.

FIG. 3 is a diagram providing a visual representation 30 of different levels of trust for certificates based on different levels of validation. DV, OV, and EV certificates are shown are shown as an example. DV represents a simple start for identifying a Jane Doe; OV adds more detail to identifying the Jane Doe; and EV provides a clear identification of Jane Doe. Thus, the TLS/SSL certificates and digital trust can give customers a clearer picture of who you are. Jane Doe may be an anonymous, unidentifiable Internet user whose actions cannot be tracked. This user may be a benign user or a malicious user. However, without sufficient identity, Jane Doe may remain anonymous and trusting this user with personal information would clearly be inadvisable.

Therefore, as shown in FIG. 3 and as described in the table 25 of FIG. 2, an organization may choose to have high assurance of trust with OV and EV digital certificates to protect their brand and reputation. EV TLS/SSL certificates protect businesses and brands because they certify that website owners are the authentic owners of their website. Before they can obtain an EV certificate, users demonstrate that they have legal rights to represent their business organization, web domain, physical address, and business entity, among 14 other criteria. OV certificates are secondary to EV because they require similar methods of authentication, including verifying the web domain, and affiliated business organization, such as Inc., Corp, LLC, etc. However, OV certificates only require nine methods of validation compared to the 14 methods required for EV.

FIG. 4 is a block diagram illustrating a conversion system 40 for validating IPv6 addresses from an IPv4 domain. As shown in FIG. 4, the conversion system 40 includes a validation server 42, which may be part of the CA 18 shown in FIG. 1 for performing validation and/or pre-validation services. In some embodiments, the validation server 42 is configured in the cloud (e.g., using Amazon Web Server (AWS), etc.) and/or may be incorporated within one or more data centers associated with the CA 18. Also, the validation server 42 may operate in an IPv4 network 44 that normally handles only IPv4 addresses.

However, according to various embodiments of the present disclosure, the conversion system 40 further includes a proxy server 46, which may be configured in an IPv6 network 46 that handles IPv4 and IPv6 addresses. The proxy server 46 is configured to access an IPv6 domain 50 to perform validation services using IPv6 addresses on behalf of the validation server 42. In some respects, the validation server 42 could be considered as an auditing network component that leverages information that the proxy server 46 can pull through an un-audited network (i.e., the IPv6 network 48).

Generally, the validation server 42 may include the functionality that has been previously developed for use with IPv4 addresses to validate domains. However, in order to allow the validation server 42 to utilize its previously established rich features within the IPv6 realm as well, the proxy server 46 is configured to act externally to the validation server 42 to bridge the gap for utility with respect to IPv6 addresses. The proxy server 46 is configured to inspect Domain Name System (DNS) entries and verify there is an IPv6 address. In some cases, the proxy server 46 can determine if the IPv6 domain is reachable and whether the DNs entry can be retrieved.

The validation server 42 is configured to automatically search and retrieve information that can be used to validate the identity of an admin or other user. One aspect of this process includes asking the admin to do something within the domain that the validation server 42 can observe. In one example, the admin may put a random value at a specific URL, and then the proxy server 46 can search the URL in the IPv6 domain 50 and return the contents (random value) to see if they agree. This is therefore used to show that the admin has control within their organization's domain. The validation server 42 may check for Domain Name System (DNS) entries associated with an admin or send emails to the admin to ensure that they do actually manage the respective domain. This may be performed within the context of certificate validation.

The validation server 42 may represent many validation service systems used today, which are designed to operate on the IPv4 network 44. However, they are typically unable to validate IPv6 domains. As mentioned above, there is a growing need to validate IPv6 domains as IPv6 rolls out. Today, because many validation services cannot access IPv6, the process is manual, which, of course, takes more time and resources and lacks audit or control features. Therefore, to overcome the issue with prior validation services, the proxy server 46, operating in the IPv6 network 48, is configured to connect the validation server 42 (e.g., still on the IPv4 network 44) with the IPv6 address space in the IPv6 domain 50.

The proxy server 46 simply acts on behalf of the validation server 42 and is configured to obtain information from the IPv6 domain 50 and pass it straight back to the validation server 42, which can then perform all of the processing, auditing, etc., as before. The validation server 42 outputs an HTTP GET command for reading or retrieving a representation of a resource in the domain. The proxy server 46 is configured output its own GET command to the IPv6 domain 50 to retrieve validation information that can be used for validating a user. The proxy server 46 in the IPv6 network 48 performs the HTTP GET request and returns a status code of "200" to signify success. The response status code is sent along with a response body (e.g., validation information). When an error is discovered, a response code 404 ("not found") can be returned.

Therefore, according to various embodiments, the validation server 42 remains as-is. There is still control and auditability. The proxy server 46 can be an external server and does not necessarily need to be secure, as it may not be involved in the actual validation process but may simply fetch (GET) data.

According to various embodiments, the conversion system 40 may use any suitable method for converting or transitioning between IPv4 and IPv6. For example, these transitioning mechanisms may allow IPv4-only network and IPv6-only networks to communicate with each other. One transition mechanism is a dual stack approach in which devices and networks run both IPv4 and IPv6 simultaneously. Dual stack allows devices to communicate using either IPv4 or IPv6 based on the availability of compatible addressing schemes. Another transition mechanism is tunneling (e.g., Multi-Protocol Label Switching (MPLS) tunneling), which is configured to encapsulate IPv6 packets within IPv4 packets (or vice versa) to transmit them over networks that do not support the encapsulated protocol. Also, Network Address Translation (NAT) strategies may be used to transition between IPv4 and IPv6. These transition mechanisms may help to facilitate the coexistence and interoperability of IPv4 and IPv6 networks during the current transition period and before full adoption of IPv6.

Figure 5:
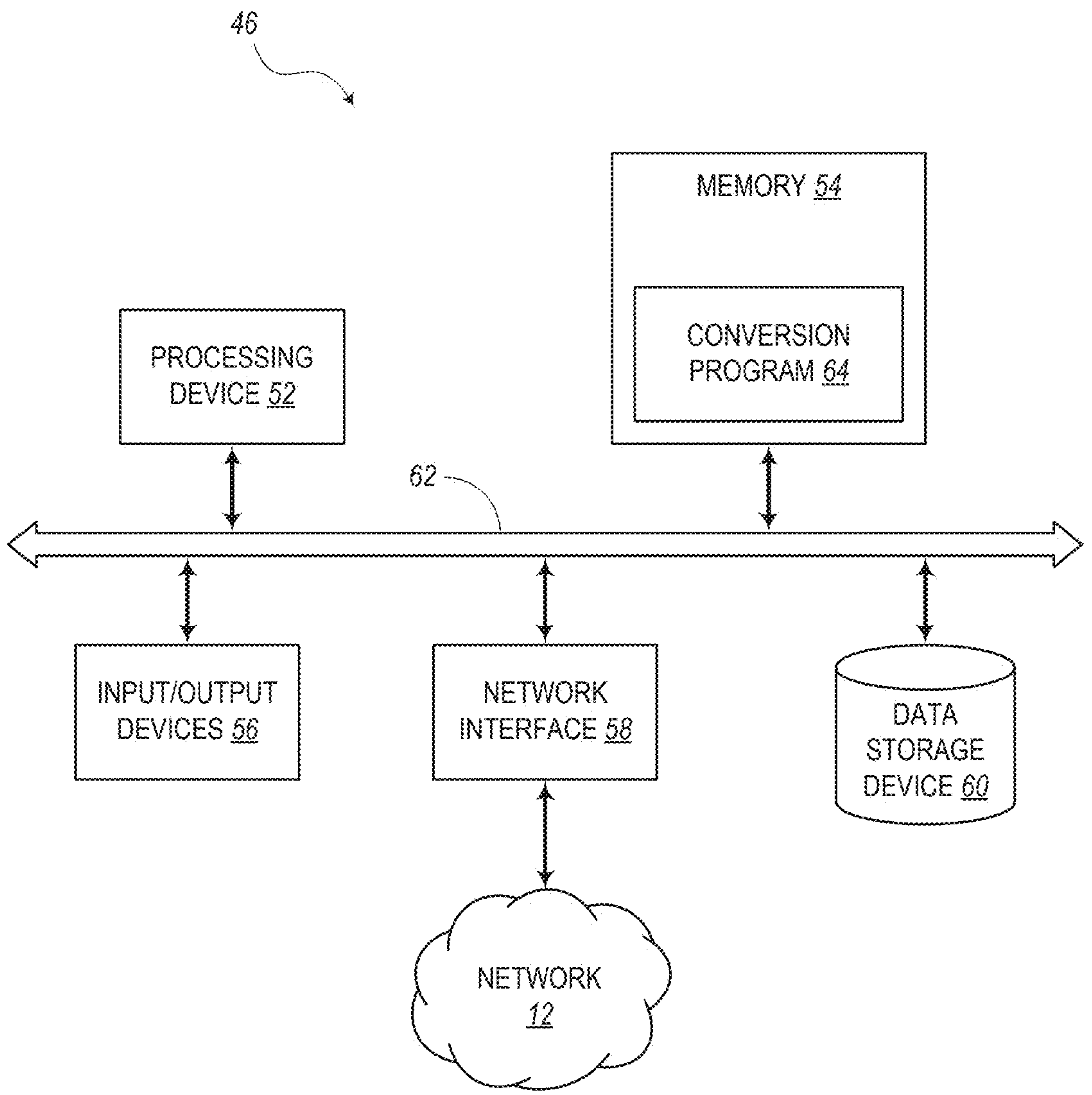
FIG. 5 is a block diagram illustrating a computing system of the proxy server shown in FIG. 4, according to various embodiments.

FIG. 5 is a block diagram illustrating an embodiment of a computing system of the proxy server 46 shown in FIG. 4. The proxy server 46 may be a digital computer that, in terms of hardware architecture, generally includes a processing device 52, memory 54, input/output (I/O) devices 56, a network interface 58, and a data storage device 60. It should be appreciated by those of ordinary skill in the art that FIG. 5 depicts the proxy server 46 in an oversimplified manner, and a practical embodiment may include additional components and suitably configured processing logic to support known or conventional operating features that are not described in detail herein. The components (52, 54, 56, 58, 60) are communicatively coupled via a local interface 62. The local interface 62 may be, for example, but not limited to, one or more buses or other wired or wireless connections, as is known in the art. The local interface 62 may have additional elements, which are omitted for simplicity, such as controllers, buffers (caches), drivers, repeaters, and receivers, among many others, to enable communications. Further, the local interface 62 may include address, control, and/or data connections to enable appropriate communications among the aforementioned components.

The processing device 52 is a hardware device for executing software instructions. The processing device 52 may be any custom made or commercially available processor, a Central Processing Unit (CPU), an auxiliary processor among several processors associated with the proxy server 46, a semiconductor-based microprocessor (in the form of a microchip or chipset), or generally any device for executing software instructions. When the proxy server 46 is in operation, the processing device 52 is configured to execute software stored within the memory 54, to communicate data to and from the memory 54, and to generally control operations of the proxy server 46 pursuant to the software instructions. The I/O devices 56 may be used to receive user input from and/or for providing system output to one or more devices or components.

The network interface 58 may be used to enable the proxy server 46 to communicate on the network 12, such as the Internet. The network interface 58 may include, for example, an Ethernet card or adapter or a Wireless Local Area Network (WLAN) card or adapter. The network interface 58 may include address, control, and/or data connections to enable appropriate communications on the network. A data storage device 60 (e.g., one or more databases, data stores, etc.) may be used to store data. The data storage device 60 may include volatile memory elements (e.g., random access memory (RAM, such as DRAM, SRAM, SDRAM, and the like)), nonvolatile memory elements (e.g., ROM, hard drive, tape, CDROM, and the like), and combinations thereof.

Moreover, the data storage device 60 may incorporate electronic, magnetic, optical, and/or other types of storage media. In one example, the data storage device 60 may be located internal to the proxy server 46, such as, for example, an internal hard drive connected to the local interface 62 in the proxy server 46. Additionally, in another embodiment, the data storage device 60 may be located external to the proxy server 46, such as, for example, an external hard drive connected to the I/O devices 56 (e.g., SCSI or USB connection). In a further embodiment, the data storage device 60 may be connected to the proxy server 46 through a network, such as, for example, a network-attached file server.

The memory 54 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 54 may incorporate electronic, magnetic, optical, and/or other types of storage media. Note that the memory 54 may have a distributed architecture, where various components are situated remotely from one another but can be accessed by the processing device 52. The software in memory 54 may include one or more software programs, each of which includes an ordered listing of executable instructions for implementing logical functions. The software in the memory 54 includes a suitable Operating System (O/S) and one or more programs. The O/S essentially controls the execution of other computer programs, such as the one or more programs, and provides scheduling, input-output control, file and data management, memory management, and communication control and related services. The one or more programs may be configured to implement the various processes, algorithms, methods, techniques, etc. described herein.

The proxy server 46 further includes a conversion program 64 that may be implemented in any suitable combination of hardware (e.g., configured in the processing device 52) and/or software/firmware (e.g., configured in the memory 54). The conversion program 64 may be stored in any suitable non-transitory computer-readable media (e.g., the memory 54) and may include computer logic or code having instructions that enable or cause the processing device 52 to perform certain actions as discussed in the present disclosure. For example, the conversion program 64 may be configured to include computer logic or instructions for causing or enabling the processing device 52 to perform a number of functions for validating an IPv6 address from an IPv4 network.

Of note, the general architecture of the proxy server 46 can define any device described herein. However, the proxy server 46 is merely presented as an example architecture for illustration purposes. Other physical embodiments are contemplated, including virtual machines (VM), software containers, appliances, network devices, and the like.

In an embodiment, the various techniques described herein can be implemented via a cloud service. Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. The phrase "Software as a Service" (SaaS) is sometimes used to describe application programs offered through cloud computing. A common shorthand for a provided cloud computing service (or even an aggregation of all existing cloud services) is "the cloud."

According to various implementations of the present disclosure, a proxy server may include a network interface, a processing device, and memory, where the memory is configured to store computer logic having instructions that, when executed, cause the processing device to perform a step of receiving an IPv4-based request via the network interface, wherein the network interface is configured to receive the IPv4-based request from a validation server (e.g., validation server 42) that is configured to support an IPv4 address space. Also, the instructions are configured to cause the processing device to send an IPv6-based request via the network interface to a domain (e.g., IPv6 domain 50) supporting an IPv6 address space. Next, the instructions cause the processing device to receive, via the network interface, a response status code and domain validation information from the domain. Then, the processing device is configured to pass the response status code and domain validation information, via the network interface, to the validation server 42.

Furthermore, in some embodiments, the IPv4-based request may be configured to represent a HTTP GET request. Before the step of sending the IPv6-based request to the domain, the instructions may further cause the processing device 52 to perform a step of converting the IPv4-based request into the IPv6-based request. For example, the IPv6-based request may represent a second HTTP GET request for requesting the domain validation information from the IPv6 address space. The validation server 42 may be configured to execute a domain validation procedure configured to confirm that an administrator associated with the domain is authorized to manage the domain.

In some implementations, the validation server 42 may be associated with a cloud-based Certificate Authority (CA) (e.g., CA 18). The step of passing the domain validation information to the validation server may include a step of enabling the validation server 42 to automatically validate IPv6 addresses. The CA 18 may be configured to operate within the IPv4 address space. The CA 18 may also be configured to issue digital certificates after automatically validating the IPv6 addresses. The proxy server 46, according to some embodiments, may be arranged externally with respect to the validation server 42. According to HTTP standards, a response status code of 200, for example, indicates a successful request.

Figure 6:
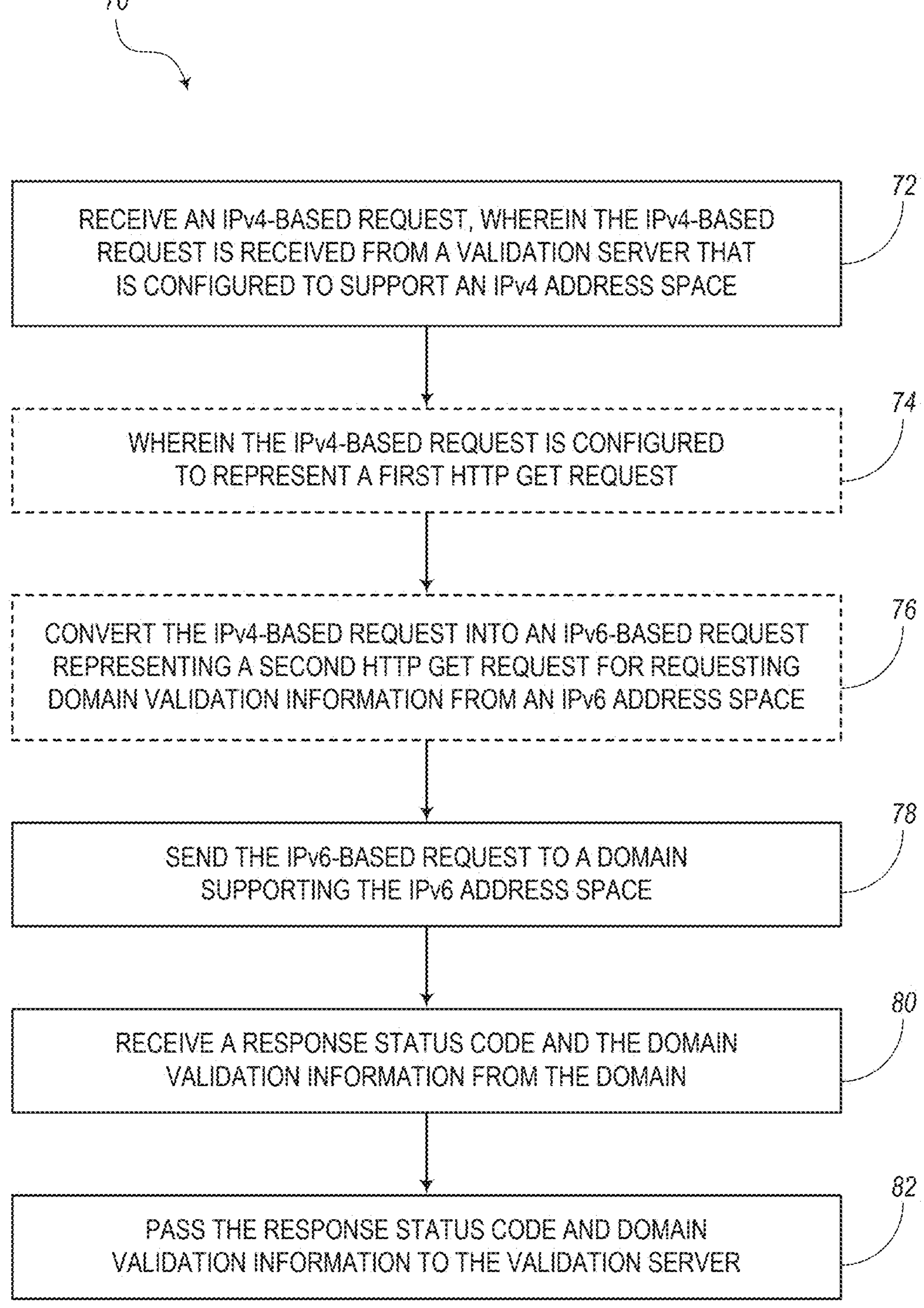
FIG. 6 is a flow diagram illustrating a method for validating IPv6 addresses from an IPv4 domain, according to various embodiments of the present disclosure.

FIG. 6 is a flow diagram illustrating an embodiment of a method 70 for validating IPv6 addresses from an IPv4 domain. In this embodiment, the method 70 includes a step of receiving an IPv4-based request, as indicated in block 72, wherein the IPv4-based request is received from a validation server that is configured to support an IPv4 address space. For example, as suggested in block 74, the IPv4-based request may be configured to represent a first HTTP GET request. The method 70, in some embodiments, may further include a step of converting the IPv4-based request into an IPv6-based request representing a second HTTP GET request for requesting domain validation (DV) information from an IPv6 address space, as indicated in block 76. The method 70 further includes a step of sending the IPv6-based request to a domain supporting an IPv6 address space, as indicated in block 78. Next, the method 70 includes receiving a response status code and the domain validation information, as requested, from the domain, as indicated in block 80. Also, the method 70 includes a step of passing the response status code and domain validation information to the validation server, as indicated in block 82. According to some generalized implementations, blocks 74 and 76 may be omitted with respect to a simplified process.

According to additional embodiments, the method 70 may include enabling the validation server to execute a domain validation procedure configured to confirm that an administrator associated with the domain is authorized to manage the domain. For example, the validation server may be associated with a cloud-based CA, wherein the step of passing the domain validation information to the validation server (block 82) may include a step of enabling the validation server to automatically validate IPv6 addresses. The cloud-based CA, for example, may be configured to operate within the IPv4 address space. Also, the CA may be configured to issue digital certificates after automatically validating the IPv6 addresses. The method 70 may be executed by a proxy server (e.g., proxy server 46), which may be arranged externally with respect to the validation server. Again, a response status

CONCLUSION

Those skilled in the art will recognize that the various embodiments may include processing circuitry of various types. The processing circuitry might include, but are not limited to, general-purpose microprocessors; Central Processing Units (CPUs); Digital Signal Processors (DSPs); specialized processors such as Network Processors (NPs) or Network Processing Units (NPUs), Graphics Processing Units (GPUs); Field Programmable Gate Arrays (FPGAs); or similar devices. The processing circuitry may operate under the control of unique program instructions stored in their memory (software and/or firmware) to execute, in combination with certain non-processor circuits, either a portion or the entirety of the functionalities described for the methods and/or systems herein. Alternatively, these functions might be executed by a state machine devoid of stored program instructions, or through one or more Application-Specific Integrated Circuits (ASICs), where each function or a combination of functions is realized through dedicated logic or circuit designs. Naturally, a hybrid approach combining these methodologies may be employed. For certain disclosed embodiments, a hardware device, possibly integrated with software, firmware, or both, might be denominated as circuitry, logic, or circuits "configured to" or "adapted to" execute a series of operations, steps, methods, processes, algorithms, functions, or techniques as described herein for various implementations.

Additionally, some embodiments may incorporate a non-transitory computer-readable storage medium that stores computer-readable instructions for programming any combination of a computer, server, appliance, device, module, processor, or circuit (collectively "system"), each potentially equipped with one or more processors. These instructions, when executed, enable the system to perform the functions as delineated and claimed in this document. Such non-transitory computer-readable storage mediums can include, but are not limited to, hard disks, optical storage devices, magnetic storage devices, Read-Only Memory (ROM), Programmable Read-Only Memory (PROM), Erasable Programmable Read-Only Memory (EPROM), Electrically Erasable Programmable Read-Only Memory (EEPROM), Flash memory, etc. The software, once stored on these mediums, includes executable instructions that, upon execution by one or more processors or any programmable circuitry, instruct the processor or circuitry to undertake a series of operations, steps, methods, processes, algorithms, functions, or techniques as detailed herein for the various embodiments.

While the present disclosure has been detailed and depicted through specific embodiments and examples, it is to be understood by those skilled in the art that numerous variations and modifications can perform equivalent functions or yield comparable results. Such alternative embodiments and variations, which may not be explicitly mentioned but achieve the objectives and adhere to the principles disclosed herein, fall within its spirit and scope. Accordingly, they are envisioned and encompassed by this disclosure, warranting protection under the claims associated herewith. Additionally, the present disclosure anticipates combinations and permutations of the described elements, operations, steps, methods, processes, algorithms, functions, techniques, modules, circuits, etc., in any manner conceivable, whether collectively, in subsets, or individually, further broadening the ambit of potential embodiments.

What is claimed is:

1. A proxy server comprising:

a network interface;

a processing device; and memory configured to store computer logic having instructions that, when executed, cause the processing device to perform steps of:

a) receiving an Internet Protocol version 4 (IPv4)-based request via the network interface, wherein the network interface is configured to receive the IPv4-based request from a validation server that is configured to support an IPv4 address space, b) sending an IP version 6 (IPv6)-based request via the network interface to a domain supporting an IPv6 address space, c) receiving, via the network interface, a response status code and domain validation information from the domain, and d) passing the response status code and the domain validation information, via the network interface, to the validation server.

2. The proxy server of claim 1, wherein the IPv4-based request is configured to represent a first HTTP GET request.

3. The proxy server of claim 2, wherein, before the step of sending the IPv6-based request to the domain, the instructions further cause the processing device to perform a step of converting the IPv4-based request into the IPv6-based request, the IPv6-based request representing a second HTTP GET request for requesting the domain validation information from the IPv6 address space.

4. The proxy server of claim 1, wherein the validation server is configured to execute a domain validation procedure configured to confirm that an administrator associated with the domain is authorized to manage the domain.

5. The proxy server of claim 1, wherein the validation server is associated with a cloud-based Certificate Authority (CA), and wherein the step of passing the domain validation information to the validation server includes a step of enabling the validation server to automatically validate IPv6 addresses.

6. The proxy server of claim 5, wherein the CA is configured to operate within the IPv4 address space.

7. The proxy server of claim 5, wherein the CA is configured to issue digital certificates after automatically validating the IPv6 addresses.

8. The proxy server of claim 1, wherein the proxy server is arranged externally with respect to the validation server.

9. The proxy server of claim 1, wherein a response status code of 200 indicates a successful request.

10. A method comprising steps of:

receiving an IPv4-based request from a validation server that is configured to support an IPv4 address space;

sending an IPv6-based request to a domain supporting an IPv6 address space;

receiving a response status code and domain validation information from the domain; and passing the response status code and the domain validation information to the validation server.

11. The method of claim 10, wherein the IPv4-based request is configured to represent a first HTTP GET request.

12. The method of claim 11, wherein, before the step of sending the IPv6-based request to the domain, the method further comprises a step of converting the IPv4-based request into the IPv6-based request, wherein the IPv6-based request represents a second HTTP GET request for requesting the domain validation information from the IPv6 address space.

13. The method of claim 10, wherein the validation server is configured to execute a domain validation procedure configured to confirm that an administrator associated with the domain is authorized to manage the domain.

14. The method of claim 10, wherein the validation server is associated with a cloud-based Certificate Authority (CA), and wherein the step of passing the domain validation information to the validation server includes a step of enabling the validation server to automatically validate IPv6 addresses.

15. The method of claim 14, wherein the CA is configured to operate within the IPv4 address space.

16. The method of claim 14, wherein the CA is configured to issue digital certificates after automatically validating the IPv6 addresses.

17. A non-transitory computer-readable medium configured to store a conversion program having instructions that, when executed, enable a processing device to:

receive an IPv4-based request from a validation server that is configured to support an IPv4 address space;

send an IPv6-based request to a domain supporting an IPv6 address space;

receive a response status code and domain validation information from the domain; and pass the response status code and the domain validation information to the validation server.

18. The non-transitory computer-readable medium of claim 17, wherein the IPv4-based request is configured to represent a first HTTP GET request, wherein, before sending the IPv6-based request to the domain, the instructions further enable the processing device to convert the IPv4-based request into the IPv6-based request, and wherein the IPv6-based request represents a second HTTP GET request for requesting the domain validation information from the IPv6 address space.

19. The non-transitory computer-readable medium of claim 17, wherein the conversion program is configured in a proxy server arranged externally with respect to the validation server.

20. The non-transitory computer-readable medium of claim 17, wherein a response status code of 200 indicates a successful request.

* * * * *